Feb. 23, 1971     H. F. HOLCOMB ET AL     3,564,907
APPLANATION TONOMETER
Filed Nov. 17, 1967     5 Sheets-Sheet 1
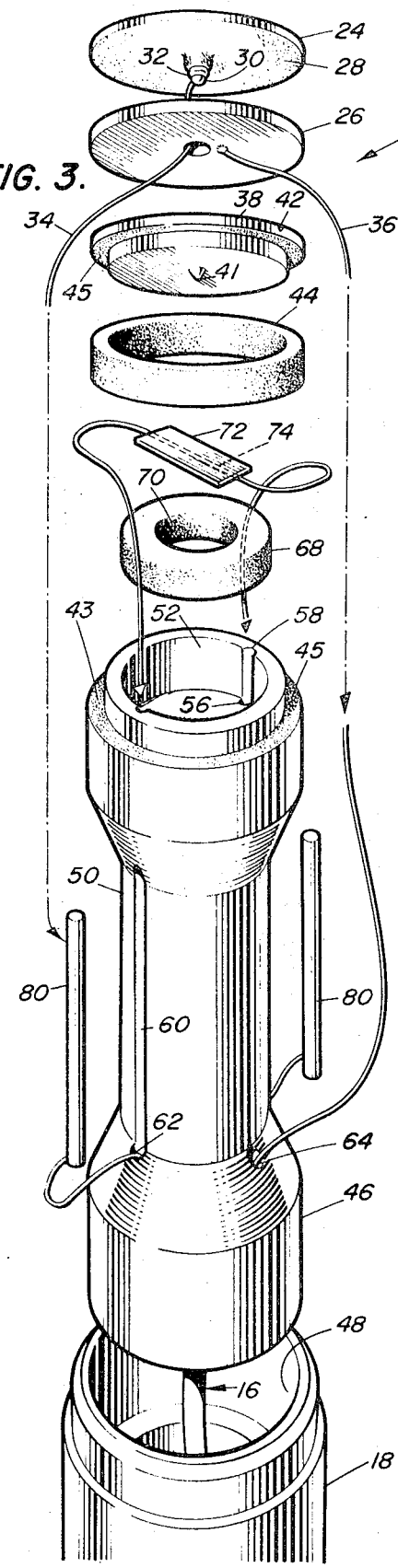
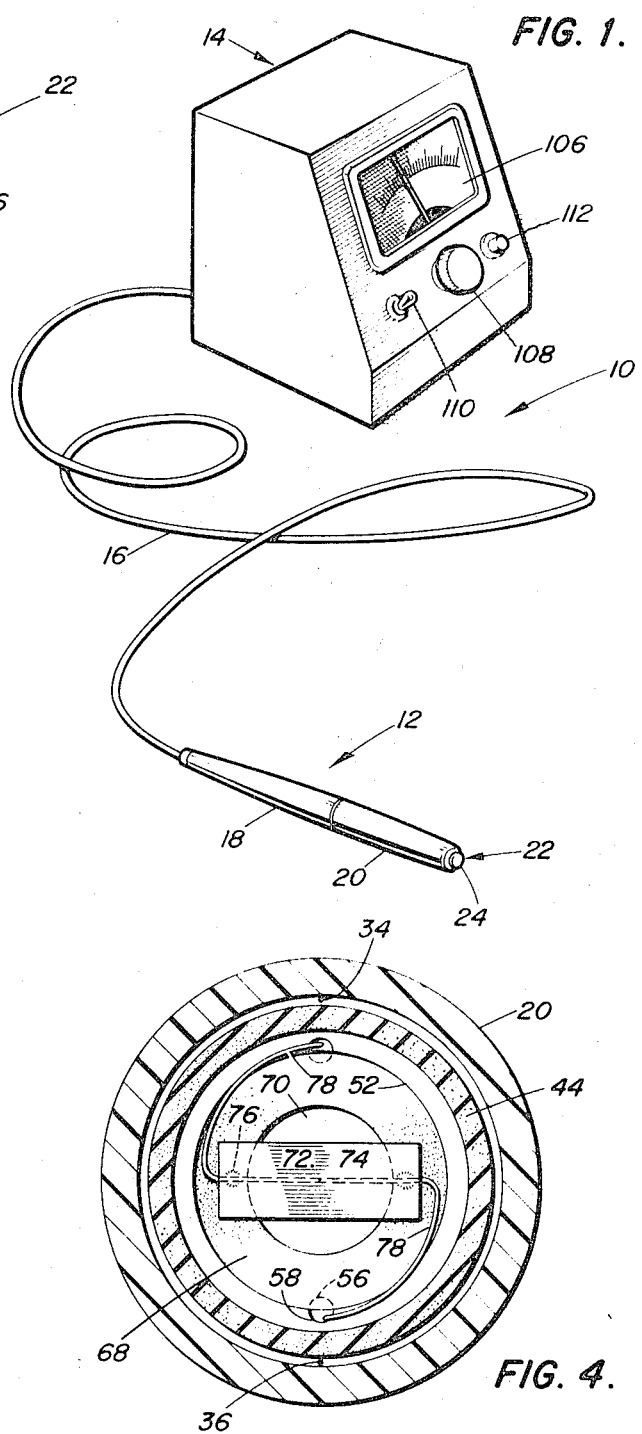
INVENTORS
HARRY F. HOLCOMB
MIQUEL MARTINEZ
BY *Walter G. Finch*
ATTORNEY

INVENTORS
HARRY F. HOLCOMB
MIQUEL MARTINEZ

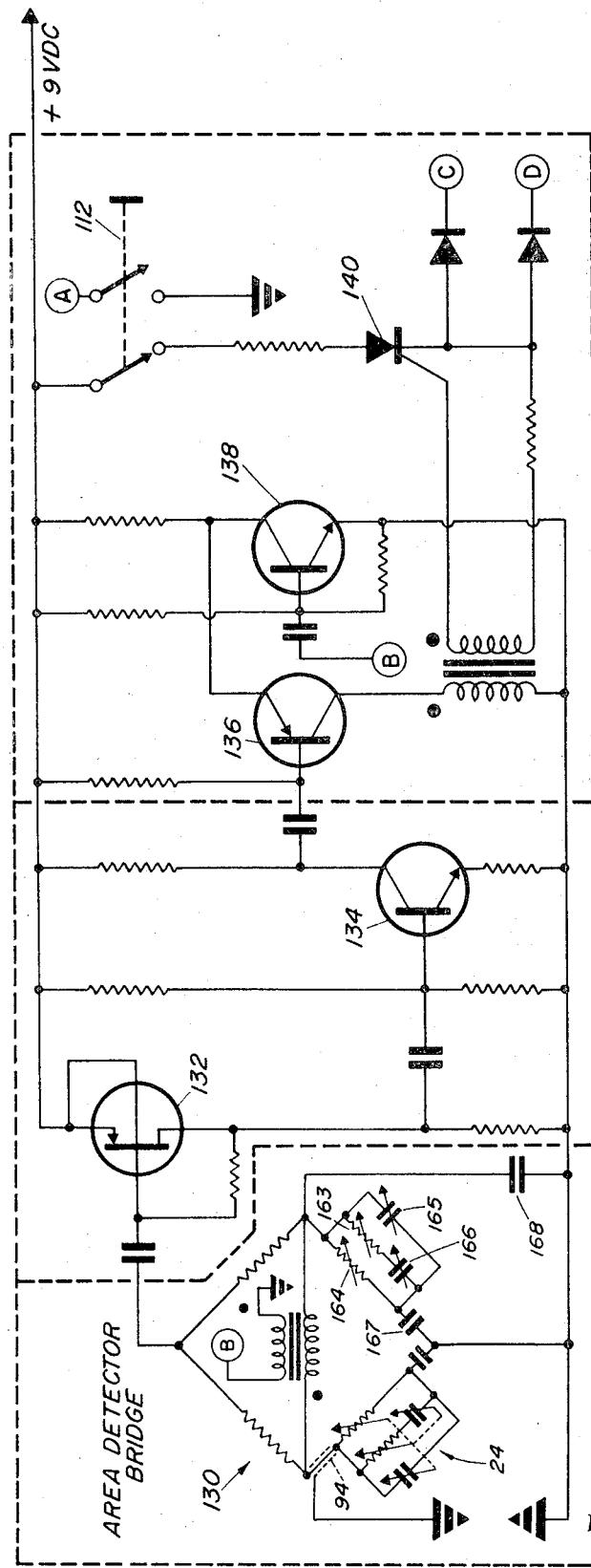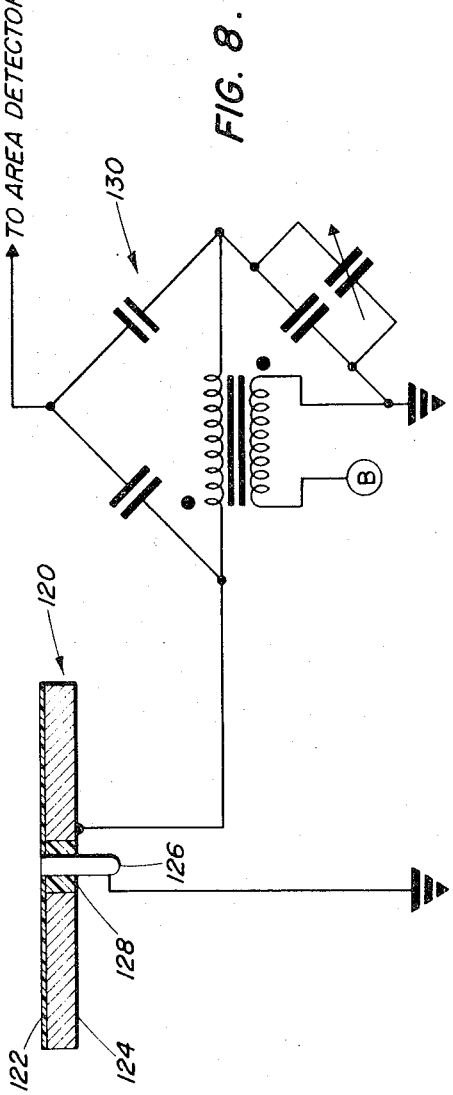
FIG. 7.
FIG. 8.
INVENTORS
HARRY F. HOLCOMB
MIQUEL MARTINEZ
BY Walter G. Finch
ATTORNEY

United States Patent Office 3,564,907
Patented Feb. 23, 1971

3,564,907
APPLANATION TONOMETER
Harry F. Holcomb and Miquel Martinez, Baltimore, Md., assignors to The Johns Hopkins University, a corporation of Maryland
Filed Nov. 17, 1967, Ser. No. 683,933
Int. Cl. A61b 3/16
U.S. Cl. 73—80     7 Claims

ABSTRACT OF THE DISCLOSURE

An all-electric tonometer of the applanation type is disclosed. In the form of a pen-sized probe for application to the cornea of a patient, the device makes use of a strain gauge to produce a force signal. The tear-wetted area of the applanation surface produces another signal proportional to this area and the signals are effectively combined and read out as intraocular pressure on a single meter.

---

Two forms of area detectors are described, one resistive-capacitive in operation and one capacitive in operation.

A fulcrum-knob force link together with rubber suspension assures constant and mathematically correct force transmission from the eye to the straing gauge at considerable off-normal attitude of the probe.

The associated circuit comprises solid state amplification of bridge-derived signals. A null detector is used to extract a predetermined area signal which with a silicon controlled rectifier stores a capacitor charge representative of pressure for meter readout. After the instrument is removed from the eye this reading persists for several minutes.

This invention relates generally to medical diagnostic instruments, and more particularly it pertains to all-electric tonometers of the applanation type.

The measurement of pressure inside the eyeball for the diagnosis of glaucoma is well known. Of the many instruments which are now available for the purpose, none completely fulfill the opthalmologist's conception of an ideal tonometer as to accuracy, convenience of use, comfort and safety to patient and low costs.

The Schiotz instrument is a simple, small, entirely mechanical device but often unreliable and inconsistent. The plunger exerts considerable force on the cornea with the resulting deformity introducing an additional factor of variable elasticity from eye to eye. It makes some time to stabilize the instrument and is therefore uncomfortable and potentially dangerous to patient and time consuming to the operator.

A more accurate determination of eye pressure makes use of flattening (applanation) of the cornea as opposed to depression as described by Robert A. Moses, in the American Journal of Ophthalmology, vol. 46, p. 865, December 1958. This is exemplified by the Goldman device which, however, requires special lighting and optics to determine the amount of applanation through visual observation by the operator. A spring scale must be read as the correct area of flattening of the cornea is obtained. Fluorescein drops must be used in the eye, as pointed out by Moses supra.

The MacKay-Marg instrument dispenses with fluorescein and the optical means but relies on recording chart readout of a magnetic stain gauge and an applanation limited by the dimensions of the probe. The disadvantage lies in the necessity of employing a recorder and in the uncertainty of the probe application, the correct condition which obtains only on exact tangency to the eyeball. Its use may cause considerable pressure elevation within the eye, and falsely high readings are common as pointed out in the following articles: Schulz, H. P.; Hilton & McEwen, Archives of Opthalmology, 69, p. 78, June 1963; Marg, Elwin; MacKay and Oechsli, Vision Research, vol. 1, pp. 379–385; and Moses, Robert A.; Marg and Oechsli, Investigative Opthalmology, vol. 1, No. 1, February 1962.

Accordingly, it is an object of this invention to provide a tonometer probe which has none of the disadvantages recited and which determines both the applanation area and pressure in electrical terms.

Another object of this invention is to provide an all-electric applanation tonometer instrument which indicates intraocular pressure in standard units directly on a single meter without requiring a specified probe position or angle relative to the cornea.

Still another object of this invention is to provide an impedance device, resistive-capicative in nature, for determining contact area of a probe with an eyeball.

Yet another object of this invention is to provide an electro-capacitive device for determining contact area of a probe with an eyeball.

Another object of this invention is to provide a rapid acting tonometer of extreme gentleness to the eye, while retaining high accuracy.

Other objects and attendant advantages of this invention will become more readily apparent and understood from the detailed specification and accompanying drawings in which:

FIG. 1 is a perspective view of an applanation tonometer incorporating features of this invention;

FIG. 3 is an exploded perspective view depicting the elements of the head assembly;

FIG. 4 is a cross section taken on line 4—4 of FIG. 2 and viewed in the direction of the arrows;

Figure 5:
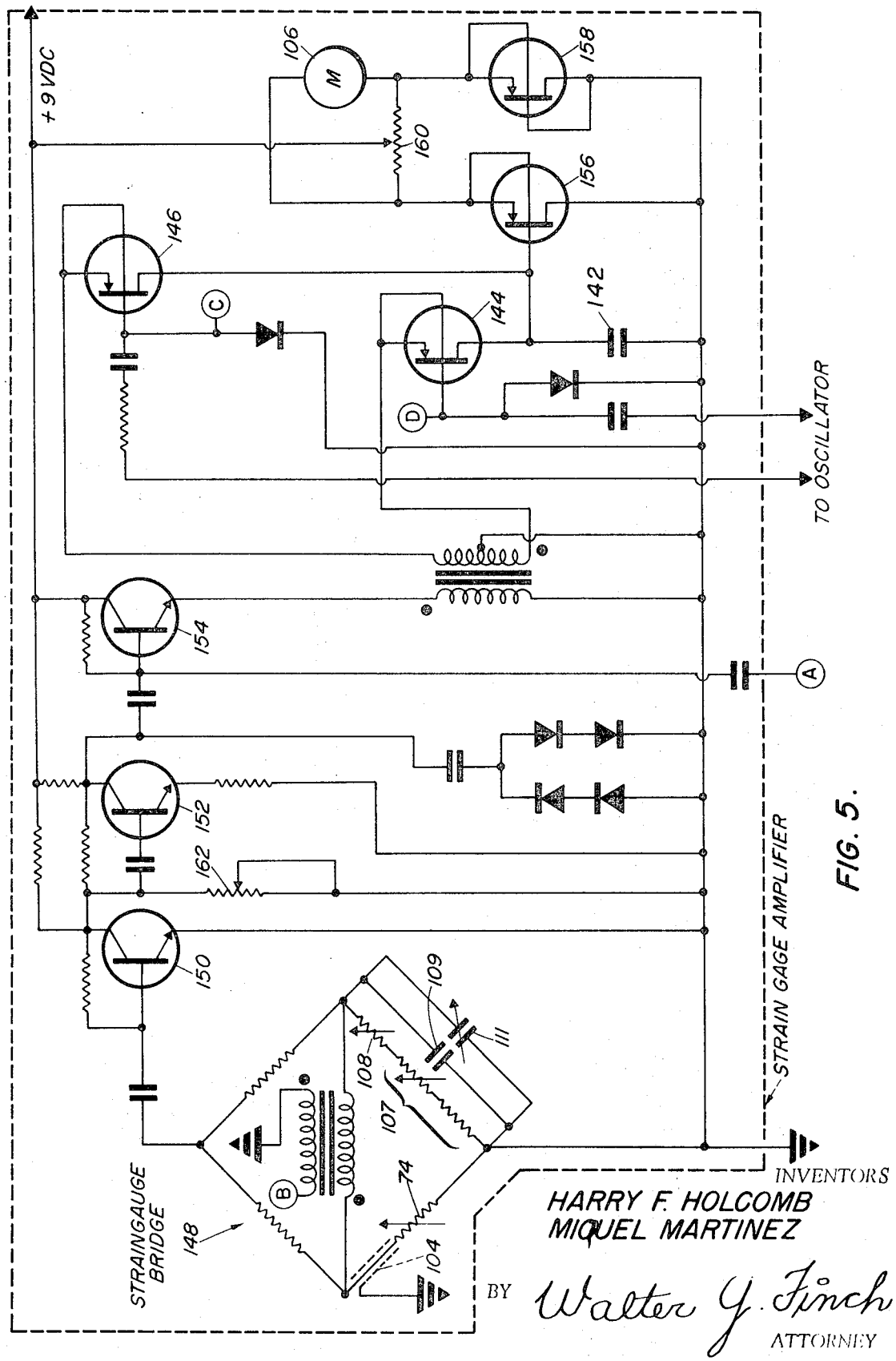
Figure 6:
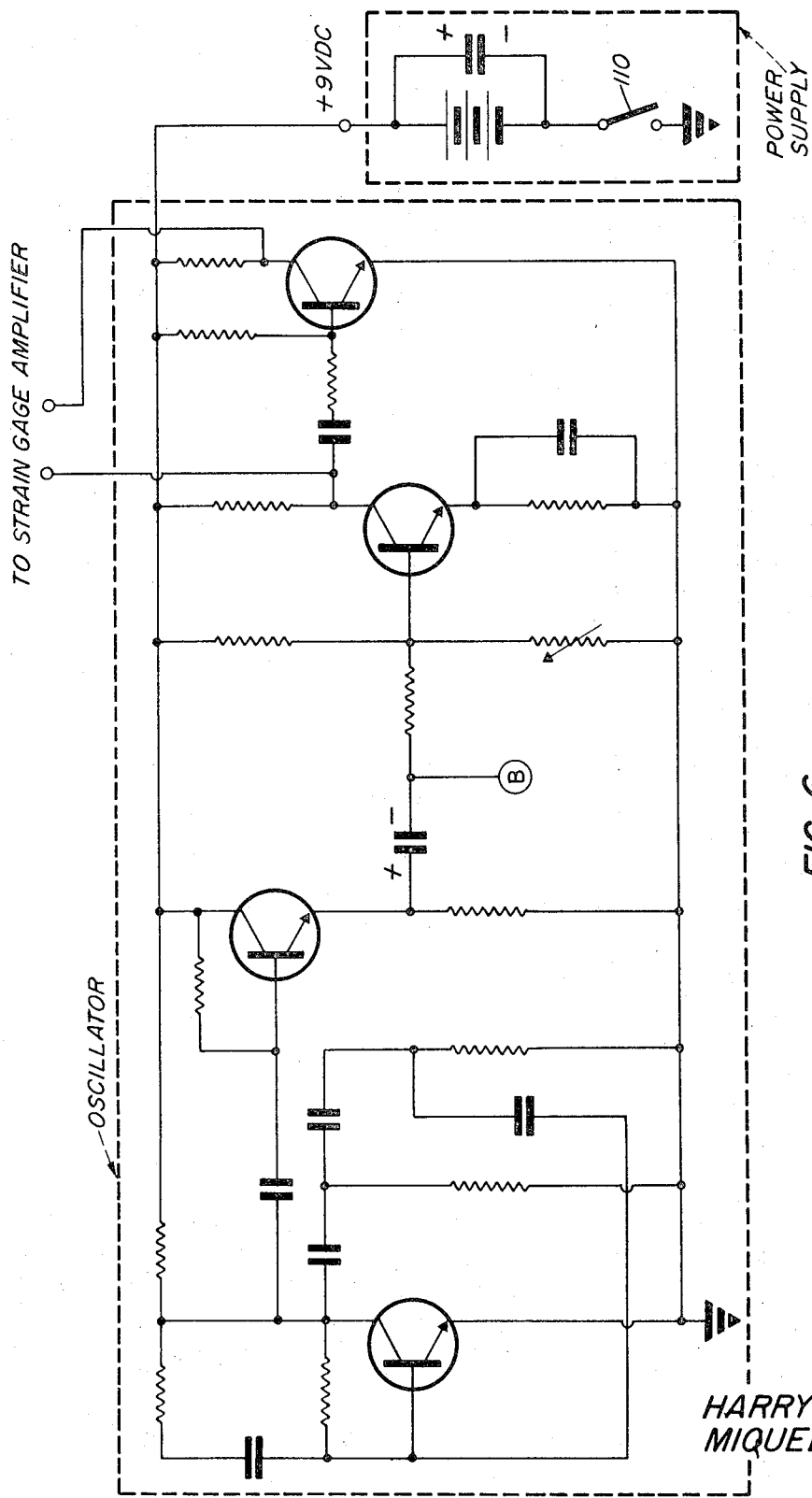

FIGS. 5, 6, and 7 are portions of a common schematic diagram of the electronics package of the applanation tonometer with alphabetic letters indicating common interconnections between the portions; and FIG. 8 is a cross section of a second embodiment of an area detector for the probe and the accompanying modifications of the schematic diagram.

Referring now to the details of the invention as shown in FIG. 1 of the drawings, reference numeral 10 indicates generally an all-electric applanation tonometer incorporating features of this invention. This tonometer 10 consists of a hand-held probe instrument 12 connected by a cable 16 to an electronics package 14. The electronic package 14 functions as a control box with a meter 106, an on-off switch 110, a reset switch 112, and a balancing rheostat 108 on its face. The electric circuit within will be mentioned later.

The probe instrument 12 is housed in a pen-shaped case consisting of a body 18 and a sleeve 20. An area detecting disc 24 of an interior head assembly 22 protrudes slightly from the end of the sleeve 20. The cable 16 enters the end of the body 18 at the opposite end of the probe instrument 12.

The area detecting disc 24 is the endmost element of the head assembly 22 housed in the sleeve 20 and is best shown in FIG. 3. It consists of a material of impedance on the order of $2 \times 10^5$ ohm-centimeters, such as manganese ferrite.

A gold electrode 30, in the form of a fine diameter wire, extends through the axial center of the disc 24 within a thin tubular glass bonding sleeve 32. The outer ends of electrode 30 and glass sleeve 32 and outer face of disc 24 are ground and polished to a common surface.

The inner face of disc 24 is attached to a brass electric contact washer 26, with low resistivity silver-loaded epoxy cement 28.

A very fine flexible insulated wire lead 34 is attached to the gold electrode 30 and is passed through the center of washer 26. Another similar wire lead 36 is soldered to the washer 26. The wire leads 34 and 36 extend radially outward in opposite directions. For their free passage, a flanged nylon cap 38 supporting the washer-disc combination 26, 24, is provided with a shallow diametrical groove 42 and an axial countersink 40 on its face, as shown best in FIG. 2.

The cap 38 is retained in a soft rubber cylindrical ring 44 with cement 45. The other end of ring 44 is similarly attached to a shoulder 43 of a spool-shaped body 46 of insulating material.

This same end of body 46 is provided with a shallow more 52 within which a strain gauge 72 is positioned upon a cylindrical rubber ring cushion 68 as best shown in FIG. 4. Fine flexible insulated leads 78 attached by welds 76 to the strain wire 74 of strain gauge 72 pass through diametrically opposite pairs of drilled passages 56 and grooves 58 to emerge in longitudinal grooves 60 formed in the reduced portion 50 of the spool-shaped body 46.

The center of one face of the strain gauge 72 is mechanically contacted by a fulcrum knob 41 protruding from the center of cap 38. The opposite face is mainly unsupported, lying over the hole 70 in the ring 68.

Figure 2:
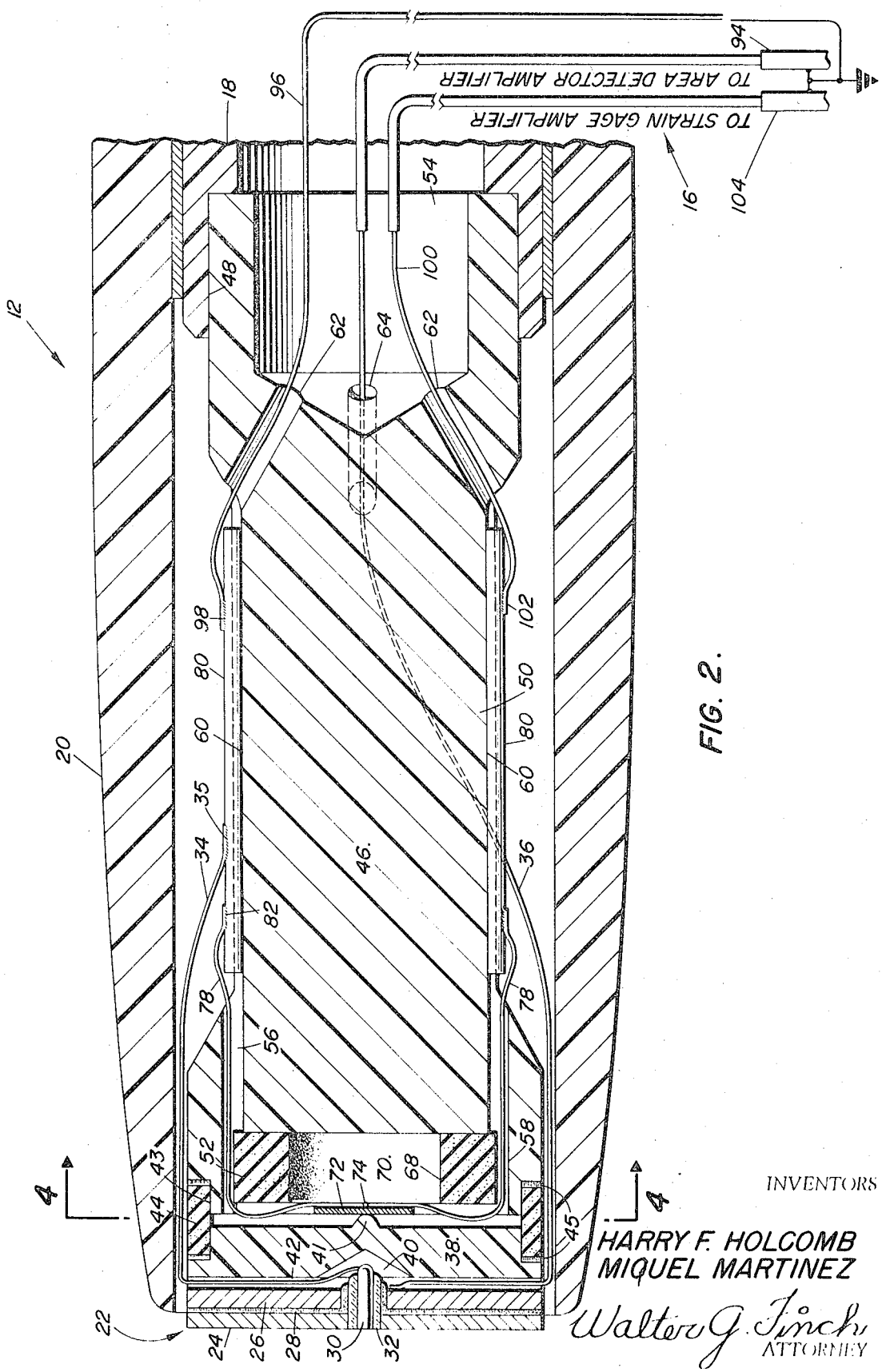
FIG. 2 is a section view taken along the longitudinal center line of the head assembly and portion of the probe body.

As shown best in FIG. 2, the grooves 60 receive short rods 80 of heavy wire which act as terminals for soldered joints 82 and 98 to effectively connect one lead wire 78 from strain gauge 72 to a ground lead 96 and the other wire lead 78 through the soldered joint 102 to the center conductor 100 of a coaxial cable 104. A bore 54 and drilled inclined passageways 62 and 64 facilitate the termination and recited connection of this coaxial cable 104 as well as that of another coaxial cable 94.

The center conductor of the latter cable 94 is in fact the previously mentioned wire lead 36 which was soldered to the contact washer 26. The other lead 34 from the gold electrode 30 is grounded by soldering it at solder joint 35 to the rod terminal 80 attached to ground lead 96 which extends from the shields of cables 94 and 104 together.

A counterbore 48 in body 18 receives the reduced end portion of the spool-shaped body 46 and the cables 94 and 104 (either twisted together or in a common jacket to form the exterior cable 16) pass longitudinally through.

The probe instrument 12 is held by the operator in the manner of a pen and the area detector end is applied to the eyeball of the patient with a gentle pressure. The surface of the eye, wet with tears, is a relatively good electrical conductor whereas the material of disc 24 is of comparatively high impedance. A minute electric current flows from the end of the gold electrode 30, through the film of tears and that portion of the disc 24 which is wetted thereby. Accordingly, a signal is created whose magnitude is proportional to the area of applanation, controlled by the area of the surface of disc 24 in contact with the tear film and therefore available for current conduction.

The force opposing the application force of the probe instrument 12 is proportional to the intraocular pressure and is transmitted through the disc 24, contact washer 26, cap 38 through knob 41 to the strain gauge 72. This knob 41 always bears against the strain gauge 72 in the manner of a fulcrum. This design makes possible a constant force transmittance from the surface of the area detecting disc 24 to the strain gauge 72, regardless of whether the instrument 12 is exactly normal to the eyeball, as long as the circle of applanation is within the circumference of the disc.

Both the coaxial cable 104 carrying the signal from the strain gauge 72 which is representative of force, and the coaxial cable 94 carrying the signal from the area detecting disc 24 are applied in the electronics package 14 to bridge circuits shown in FIGS. 5 and 7, respectively.

The bridges are powered by alternating current from an oscillator shown in FIG. 7 and are initially balanced by adjustable potentiometers and capacitors. One potentiometer 108 for the strain gauge 72, is located conveniently on the outside of package 14. The bridge output signals are both amplified and then combined as will now be related to give a single reading which can be observed on the meter 106. As mentioned above, the area detecting disc 24 senses the area of wet cornea in contact with it, that is the area of applanation, by the virture of the fact that the included ferrite represents a variable impedance in a Wheatstone bridge. An alternating potential is effectively applied between the gold electrode 30 and brass contact plate 26. When the area detecting disc 26 is not in contact with the cornea the impedance across the two electrodes is 30 and 26 is essentially infinite and the bridge is largely unbalanced. The Wheatstone bridge referred to is shown in FIG. 7 as reference 130 and the ferrite area detecting disc 24 is depicted schematically as a complex variable impedance in one arm. Resistors 163 and 164 and capacitors 165, 166, 167, and 168 are infinite resolution and fixed value zero balance elements forming another arm. The output of the Wheatstone bridge 130 connected to the manganese ferrite area detector 24 feeds into an MEM 511A field effect transistor 132 of high input impedance, the output of which drives a 2N3391A conventional transistor 134. The output of this transistor 134 drives a null point detector using the alternating current from the oscillator FIG. 6 as a reference current and as embodied in transistors 2N711B and 2N2924, reference numerals 136 and 138 respectively, which fires a silicon controlled rectifier 2N2322A reference 140 at the point at which the area detector bridge 130 is in balance. The firing of the silicon controlled rectifier 140 (through interconnecting points C and D) serves to store a charge on the capacitor 142 in FIG. 5 by means of turning off two (2) MEM 511A transistors 144 and 146 which serve as rectifiers for the amplified strain gauge signal from strain gauge bridge 148. The fired controlled rectifier is reset by push button switch 112.

This bridge 148 is similar to the previously-described area detector bridge 130. It depicts the strain gauge wire 74 schematically as a variable resistor in one arm. A fixed resistor and a variable resistor R107 roughly balance the other arm. Fine resistance balance is done with potentiometer 108 which has infinite resolution. This arm also is provided with a fixed capacitor 109 and a trimmer capacitor 111 for capacitance zero balancing the bridge 148 by compensating for the capacity in parallel with the strain gauge wire 74, mainly that of the coaxial cable 104. The signal from strain gauge wire 74 which is developed across the bridge 148 is amplified by two (2) conventional transistor 150 and 152, types 2N2925 and 2N3391, with a sensitivity control rheostat 162 included between them. The amplified strain gauge signal is fed into an emitter follower 2N3391A transistor reference 154, which is transformer coupled to the previously-mentioned 2 MEM511A transistors 144, 146. These serve to rectify the strain gauge signal and store the rectified voltage on the low-leakage capacitor 142 previously referred to in connection with the firing or silicon controlled rectifier 140 and the interconnection points C and D.

The oscillator circuit in FIG. 6 provides the sine wave which drives both the strain gauge bridge 148 in FIG. 5 and the area detector bridge 130 in FIG. 7 and further provides a phase reference sine wave for the null point detector elements 136, 138, and 140 described in connection with FIG. 7. Self-contained battery power is turned on or off by switch 110. In operation, the system is capable of detecting two independent quantities which are, however, linked by the intraocular pressure which enables one to determine the intraocular pressure by the relationship of these two independent quantities; namely, (1) the area of applanation versus (2) the amount of force applied to the eye to achieve this area of applanation. The area of applanation is measured as described above by the change in impedance of the system composed of the ferrite plate 24 and the gold electrode 30 comprising the face plate of the head of the tonometer and its connection in a Wheatstone bridge. The point at which the instrument senses the desired area of applanation therefore is determined by the values chosen in the Wheatstone bridge. The values are so picked that the bridge is in balance when an area equivalent to a circle of 3.06 mm. diameter is applanted on the wet surface of the cornea, assuming that the tear layer on the cornea offers negligible impedance to current flow. The area of a circle having a diameter of 3.06 mm. has been chosen on the basis of experiments done in conjunction with the Goldman tonometer in that it is an area large enough to provide adequate detection of the applanatory area, however, not so large as to cause significant distortion of the cornea or elevation of intraocular pressure as pointed out by Moses supra. Ideally, with such an area of applanation, namely, that of a circle having a diameter of 3.06 mm. at the applanatory end point, the front surface of the cornea, namely, the epithelium, occupies a position formerly occupied—that is, prior to applanation—by the inner surface of the cornea, namely, the endothelium. In other words, the cornea will be displaced, at maximum, by its own dimension. Presumably this results in a minimum of artifact from the thickness and elasticity of the cornea itself as indicated by Schmidt in the Transactions of Opthalmology Society, United Kingdom, 1959.

As the proper area predetermined by the values of the area detector Wheatsone bridge, previously chosen, is applied to the ferrite plate on the head, the null point detector circuit will store the charge on capacitor 142 which corresponds to the force detected by the strain gauge amplifier. The force detected by the strain gauge amplifier depicted in FIG. 5 will be derived from the distortion of the semi-conductor straing gauge 72 which receives a force unvarying with position over the surface of the ferrite plate. The instrument is so calibrated that the meter readout which is connected via the two (2) MEM 511A field effect transistors 156, 158 through a high input impedance to the capacitor 142 storing the strain gauge signal is directly in grams. This may be translated, because of the calibration factor, to millimeters of mercury on the basis of 1 gram for each 10 millimeters of mercury intraocular pressure. Such calibration has been adequately described in the literature in conjunction with the calibration of the Goldman tonometer as indicated in the article by Robert A. Moses, American Journal of Ophthalmology, vol. 46, p. 865, December 1958.

In the present case the all-electric applanation tonometer 10 is prepared for use as follows:

(1) Depress switch 112 for a D.C. balance check. If necessary, adjust for zero on meter 106 with potentiometer 160. Release switch 112.

(2) Adjust rheostat 108 for an approximate four (4) microampere depression below zero (marked by a red line) to compensate for a small element of residual corneal stiffness.

(3) Apply the surface of the area detector 24 to the cornea with a positive force of at least five (5) grams (for fifty (50) mm. of mercury intraocular pressure). (Less force is required for lower intraocular pressure.) Read intraocular pressure from meter 106. (One microampere equals one mm. of mercury.)

(4) Press switch 112 to reset the circuitry for next measurement. (The head assembly 22 should be wiped free of moisture after each measurement.)

In explanation:

(1) Resistor 162 is preadjusted for a deflection of fifty (50) microamperes on meter 106 with a force of five (5) grams applied to the strain gauge wire 74.

(2) Resistors and capacitors 163–168 are preset for balance of associated bridge 130 when a wet area of seven and thirty-five one-hundredths (7.35) mm.² is applied to the area detector disc 24. When the balance (null point) is reached the circuitry which follows the area detector amplifier 134 sends a signal to the strain gauge amplifier which stores an incoming strain gauge signal at that instant and locks the meter 106 at an indicated magnitude of that signal.

(3) In use, intraocular pressure determines the force on the strain gauge wire 74. The area of wet cornea in contact with the area detector disc 24 determines the balance of the bridge. As increasing force is applied to the strain gauge wire 74 by pressure within the eyeball, the area of cornea in contact with the area detector disc 24 increases until a null point is reached. At that point the strain gauge reading is locked on the meter 106.

The stored reading drops off only about one percent after being held for three minutes.

Instead of employing an area detector working on complex impedance principles as previously recited, another embodiment of the invention uses a probe with a capacitance type area detector as indicated by reference numeral 120 as shown in FIG. 8. Here the film of tears of the eye comprises one plate of a capacitor and is electrically connected to ground as formerly by the tip of a gold electrode-reference 126. The applanation surface or dielectric of the capacitor is a polished plastic film 122. This film 122 is backed by a brass plate 124 which is the ungrounded plate of the capacitor and the signal conductor.

The bridge 130 uses capacitor arms rather than both resistors and capacitors as will be noted from a comparison of FIGS. 8 and 7. The gold electrode 126 is mounted in the center of the backing plate 124 within a thin-walled sleeve insulator 128 of good dielectric properties. The strain gauge arrangement is the same as for the first embodiment.

The advantages of a capacitor system are greater resolution because of a thinner impedance element (film 122 as opposed to disc 24), and possibly other advantages for ease of manufacture.

In essence therefore, this instrument utilizes the same calibration as the Goldman tonometer, but escapes the confines of the Goldman in that the area of applanation is measured, not by optical methods but by an electronic method independent within limits of the position of application of the cornea on the head of the tonometer. Furthermore, since the frequency response of the instrument is of sufficient magnitude, the reading can be accomplished in a split second, merely by depressing the cornea slightly with the head of the tonometer with the patient at any position achieving results of equivalent accuracy to the Goldman without the limitations in convenience and position imposed by the Goldman tonometer.

In summary, we have devised a unique, convenient, as well as accurate way of measuring the two parameters involved in the measurement of intraocular pressure; namely, (1) the area of applanation and (2) the force applied to the cornea necessary to achieve that area of applanation. The area of applanation is measured as an impedance change on a manganese ferrite plate of high impedance and the force applied is measured independently by a semi-conductor amplified signal from a strain gauge. The alternating current from the plate which measures the applanatory area is amplified in such a way as to trigger a locking circuit at the predetermined point of proper applanation and to store the simultaneous signal from the strain gauge on a capacitor. Therefore, in a fraction of a second the force required to applanate the cornea to a given predetermined area is sensed and stored for convenient readout by a high impedance DC amplifying system. The calibration of the tonometer was chosen to be identical to that of the Goldman tonometer for purposes of accuracy and convenience in calibration; namely, an applanatory area of the area of a circle having a diameter of 3.06 mm. is achieved by proper choice of the impedances in the Wheatstone bridge in FIG. 7 and the strain gauge is calibrated in such a way that application of 1 gram to the face of the tonometer causes a deflection of the readout needle of 10 mm. of mercury whereby a proper calibration of the tonometer is achieved without undue distortion of the cornea and permitting simple calibration without complicated mathematics. This is adequately described in the reference art.

Obviously many modifications and variations of the present invention are possible in light of the above teachings. It is, therefore, to be understood that within the scope of the appended claims the invention may be practiced otherwise than as specifically described.

What is claimed is:

1. An applanation tonometer comprising means for contacting and applying force for flattening a portion of the surface of an eye, area measuring means connected to said means for contacting and applying force for detecting a preselected area of contact, with said means for contacting and applying force having spaced electrodes located in a common planar surface, with said common planar surface of said electrodes being the contact surface to said eye, with one of said electrodes in said common planar surface lying substantially within the boundary of the other of said electrodes, thereby adapting said one electrode for coming into full contact with the surface of said eye on positioning of the other of said electrodes in said common planar surface in partial contact with the surface of said eye, with the impedance of the portion of the area of the other electrode in contact with the eye being proportional to the area of contact with he eye, and means connected to said contacting and applying means and to said area measuring means for measuring the force applied to the eye at the moment said preselected area is attained, said force being proportional to the intraocular pressure.

2. An applanation tonometer as recited in claim 1, and means for electrically storing the indication of said force which is proportional to the intraocular pressure of said eye at the preselected area of contact of said electrodes.

3. An applanation tonometer as recited in claim 1, wherein said other electrode of said electrodes is formed of a material having a high electrical resistivity.

4. The applanation tonometer of claim 1, wherein said one electrode is a wire element having one end terminating at said common planar surface, said other electrode is a disc element surrounding said end of said wire element, and electrical insulating means positioned between said wire element and said disc.

5. An applanation tonometer comprising means for contacting and applying force for flattening a portion of the surface of an eye, area measuring means connected to said means for contacting and applying force for detecting a preselected area of contact, and means including a strain gage connected to said contacting and applying means and to said area measuring means for measuring the force applied to the eye at the moment said preselected area is attained, means positioned between said contacting and applying means and said strain gage for supporting said contacting and applying means, said supporting means including a means for pivotally contacting said strain gage so that said strain gage is stressed in proportion to said force applied.

6. An applanation tonometer as recited in claim 5, wherein the means for contacting and applying force and the means for supporting said contacting and applying means are integral, whereby they move as a unit in response to opposing force.

7. An applanation tonometer, comprising, means including spaced electrodes for contacting and applying force for flattening a portion of the surface of an eye, area measuring means connected to said electrodes for detecting a preselected area of contact by measuring the impedance of the electrodes, strain gauge means responsive to said force applied by said means for contacting and applying force, and circuitry means connected to said strain gauge means for providing an electrical indication of applied force.

References Cited

UNITED STATES PATENTS

| | | | |
|---|---|---|---|
| 3,338,089 | 8/1967 | Coombs | 73—80 |
| 3,359,789 | 12/1967 | Forse | 73—80 |
| 3,400,331 | 9/1968 | Harris | 324—61 |

RICHARD C. QUEISSER, Primary Examiner

C. E. SNEE III, Assistant Examiner

U.S. Cl. X.R.

128—2

UNITED STATES PATENT OFFICE
CERTIFICATE OF CORRECTION

Patent No. 3,564,907  Dated February 23, 1971

Inventor(s) Harry F. Holcomb et al.

It is certified that error appears in the above-identified patent and that said Letters Patent are hereby corrected as shown below:

Column 1, line 50, "makes" should read -- take --. Column 2, line 18, "capicative" should read -- capacitive --. Column line 18, "more" should read -- bore --. Column 4, line 53, "transistor" should read -- transistors --. Column 5, line 10 "applanted" should read -- applanated --; line 37, "straing" should read -- strain --. Column 7, line 30, "he" should read -- the --. Column 8, line 5, "flattering" should read -- flattening --.

Signed and sealed this 17th day of August 1971.

(SEAL)
Attest:

EDWARD M. FLETCHER, JR.　　　　　　　WILLIAM E. SCHUYLER, JR.
Attesting Officer　　　　　　　　　　Commissioner of Patents